United States Patent [19]

Wilson

[11] Patent Number: 5,419,934

[45] Date of Patent: May 30, 1995

[54] MULTILAYER COEXTRUDED POLYOLEFIN STRETCH WRAP FILMS

[75] Inventor: Gregory M. Wilson, Eau Claire, Wis.

[73] Assignee: Mobil Oil Corporation, Fairfax, Va.

[21] Appl. No.: 991,902

[22] Filed: Dec. 18, 1992

[51] Int. Cl.$^6$ ............................................. B65B 53/00
[52] U.S. Cl. ............................ 428/34.9; 428/35.2; 428/35.7; 428/516; 428/911; 264/171; 264/514
[58] Field of Search ............... 428/516, 518, 520, 35.2, 428/35.7, 911, 34.9; 264/514, 173, 171, 176.1, 288.4

[56] References Cited

U.S. PATENT DOCUMENTS

| | | | |
|---|---|---|---|
| 3,986,611 | 10/1976 | Dreher | 206/386 |
| 4,011,382 | 3/1977 | Levine et al. | 526/96 |
| 4,050,221 | 9/1977 | Lancaster, III et al. | 53/211 |
| 4,076,698 | 2/1978 | Anderson et al. | 526/348 |
| 4,079,565 | 3/1978 | Lancaster, III et al. | 53/3 |
| 4,205,021 | 5/1980 | Morita et al. | 525/240 |
| 4,311,808 | 1/1982 | Su | 525/222 |
| 4,364,981 | 12/1982 | Horner et al. | 428/35 |
| 4,367,256 | 1/1983 | Biel | 428/218 |
| 4,399,173 | 8/1983 | Anthony et al. | 428/35 |
| 4,399,180 | 8/1983 | Briggs et al. | 428/212 |
| 4,409,776 | 10/1983 | Usui | 53/339 |
| 4,418,114 | 11/1983 | Briggs et al. | 428/218 |
| 4,511,609 | 4/1985 | Craver et al. | 428/35 |
| 4,518,654 | 5/1985 | Eichbauer et al. | 428/331 |
| 4,522,987 | 6/1985 | Hogan et al. | 526/106 |
| 4,565,720 | 1/1986 | Yaeo et al. | 428/35 |
| 4,574,104 | 3/1986 | Aishima et al. | 428/220 |
| 4,657,811 | 4/1987 | Boyd et al. | 428/318.6 |
| 4,833,017 | 5/1989 | Benoit | 428/323 |
| 5,019,315 | 5/1991 | Wilson | 264/171 |
| 5,049,423 | 9/1991 | German, Jr. | 428/35.2 |
| 5,066,526 | 11/1991 | German, Jr. | 428/35.2 |
| 5,114,763 | 5/1992 | Brant et al. | 428/34.9 |
| 5,147,708 | 9/1992 | Brant et al. | 428/35.2 |
| 5,225,257 | 7/1993 | Brant | 428/520 |
| 5,232,767 | 8/1993 | Hisazumi et al. | 428/520 |
| 5,273,809 | 12/1993 | Simmons | 428/516 |
| 5,292,560 | 3/1994 | German | 428/34.9 |

*Primary Examiner*—Ellis P. Robinson
*Assistant Examiner*—Rena L. Dye
*Attorney, Agent, or Firm*—Alexander J. McKillop; George W. Hager, Jr.; Clinton H. Hallman, Jr.

[57] ABSTRACT

The present invention relates to multilayer coextruded thermoplastic stretch wrap films useful for the packaging or palletizing of goods. More particularly the films of this invention include at least three layers, the three layers having two outer layers and an intermediate layer positioned between said outer layers, the intermediate layer comprising a mixture of a first linear low density polyethylene and a polyolefin selected from the group consisting of homopolymers of propylene, copolymers of propylene and ethylene and mixtures thereof and at least one of the two outer layers comprising a second linear low density polyethylene. The force required to stretch the films of this invention may be controlled by the ratio of polyethylene to the selected polyolefin of the intermediate layer, by controlling the thickness of the intermediate layer relative to overall film thickness, by controlling the melt flow properties of the intermediate layer polyolefin resin or by a combination thereof.

8 Claims, No Drawings

MULTILAYER COEXTRUDED POLYOLEFIN STRETCH WRAP FILMS

FIELD OF THE INVENTION

The present invention is directed to stretch wrap polyolefinic films and methods for their production. In particular, the invention is concerned with a three layer coextruded film having an intermediate layer which includes a blend of linear low density polyethylene and polypropylene for strength, the ratio of which can be selected to provide a desired stretch force required to stretch the film during use, and two outer layers of linear low density polyethylene. The films of this invention are particularly useful for the wrapping of palletized loads.

BACKGROUND OF THE INVENTION

The use of thermoplastic stretch wrap films for the overwrap packaging of goods, and in particular, the unitizing of palleted loads, is a commercially significant application of polymeric film. Overwrapping a plurality of articles to provide a unitized load can be achieved by a variety of techniques. In one procedure, the load to be wrapped is positioned upon a platform, or turntable, which is made to rotate and in so doing, to take up stretch wrap film supplied from a continuous roll. Braking tension is applied to the film roll so that the film is continuously subjected to a stretching, or tensioning, force as it wraps around the rotating load in overlapping layers. Generally, the stretch wrap film is supplied from a vertically arranged roll positioned adjacent to the rotating pallet load. Rotational speeds of from about 5 to about 50 revolutions per minute are common. At the completion of the overwrap operation, the turntable is completely stopped and the film is cut and attached to an underlying layer of film employing tack sealing, adhesive tape, spray adhesives, etc. Depending upon the width of the stretch wrap roll, the load being overwrapped can be shrouded in the film while the vertically arranged film roll remains in a fixed position. Alternatively, the film roll, for example, in the case of relatively narrow film widths and relatively wide pallet loads, can be made to move in a vertical direction as the load is being overwrapped whereby a spiral wrapping effect is achieved on the packaged goods. Another wrapping method finding acceptance in industry today is that of hand wrapping. In this method, the film is again arranged on a roll, however, it is hand held by the operator who walks around the goods to be wrapped, applying the film to the goods. The roll of film so used may be installed on a hand-held wrapping tool for ease of use by the operator.

Some of the properties desired of a stretch wrap film include: good cling or cohesion properties; good transparency or opacity, as required; low stress relaxation with time; high resistance to transverse tear when under machine direction tension; the ability to be produced in thin gauges; low specific gravity and thus high yield in area per pound; good tensile toughness; high machine direction ultimate tensile strength; high machine direction ultimate elongation; high modulus of elasticity; and, high puncture resistance.

Physical properties which are particularly significant for the successful use of thermoplastic films in stretch wrap applications include their puncture resistance, their elongation characteristics, their toughness, and their resistance to tearing while under tension. In general, tensile toughness is measured as an area under a stress-strain curve developed for a thermoplastic film, and it may be considered as the tensile energy absorbed, expressed in units of ft.-lbs./cu.in. to elongate a film to break under tensile load. In turn, this toughness characteristic is a function of the capacity of such films to elongate. The process of stretching the film decreases that capacity. Accordingly, the stretch wrap process will decrease the toughness of the film while it is in its stretched condition as an overwrap as compared to unstretched counterparts, including such materials as shrink wrap. Generally this loss of toughness is proportional to the amount of stretch imparted to the film as it is overwrapping a load of goods.

As hereinabove indicated, the resistance to tear characteristic of such films will obviously be an important physical characteristic for stretch wrap applications since if the edge of the stretch film roll is nicked, abraded or in any way weakened before stretching or during the stretching operation, premature tearing of the film will usually occur during wrapping or subsequent handling of the load of goods.

Some resins which have been used in the fabrication of stretch wrap film are polyethylene, polyvinylchloride and ethylene vinyl acetate. A fairly recent development has been the utilization of linear low density polyethylene (LLDPE) in the manufacture of stretch wrap film, e.g., as described in U.S. Pat. Nos. 4,399,180, 4,418,114 and 4,518,654, the contents of which are incorporated by reference herein. The excellent toughness and puncture resistance properties of LLDPE makes it an excellent resin for such an application. LLDPE and methods for its manufacture are described in, among others, U.S. Pat. Nos. 3,645,992, 4,076,698, 4,011,382, 4,163,831, 4,205,021, 4,302,565, 4,302,566, 4,359,561 and 4,522,987. In general, films fabricated from the typical LLDPE resins of commerce possess little or no cling property on either surface thereof in the absence of added cling agent. LLDPE films possessing an inherent cling property wherein the LLDPE possesses a relatively high level of n-hexane extractables are disclosed in U.S. Pat. No. 5,273,809 issued on Dec. 28, 1993 from application Ser. No. 07/985,042 which is a divisional continuation application of application Ser. No. 07/903,295, filed on Jun. 24, 1992, which is a continuation-in-part of application Ser. No. 07/296,930, filed on Jan. 12, 1989, which is a continuation of application Ser. No. 07/039,892, filed on Apr. 17, 1987, the contents of each of which are incorporated by reference in their entirety.

Other thermoplastic films possessing a cling property are known in the art. U.S. Pat. No. 4,311,808 describes a cling film containing a homogeneous mixture of polyisobutylene, ethylene-propylene and a low density polyethylene.

U.S. Pat. No. 4,367,256 describes a cling wrap plastic film based on a blend of high pressure low density polyethylene (HPLDPE) and LLDPE in which the latter resin represents from 5-16 weight percent of the total. In one embodiment, this film is sandwiched between two HPLDPE films.

U.S. Pat. No. 4,399,173 describes a multilayer plastic film free of melt fracture which is suitable for a variety of applications including, by implication, the stretch wrapping of goods. The film possesses a core layer of LLDPE resin of melt index 0.2–3.0 decigrams per minute and skin layers of LLDPE resin of melt index 5.0–20.2 decigrams per minute.

U.S. Pat. Nos. 4,399,180 and 4,418,114 describe a coextruded composite stretch wrap film in which an LLDPE core layer is surfaced with HPLDPE skin layers.

In the one-sided cling stretch wrap film of U.S. Pat. No. 4,518,654, layer A of the disclosed A/B structure is fabricated from a resin possessing an inherent cling property and/or a cling property resulting from the incorporation of a cling additive therein. Layer A is coextruded with layer B, which is fabricated from a resin exhibiting little if any cling. Layer B further exhibits a slide property when in contact with a layer of itself with relative motion therebetween. Layer B can contain an anti-cling additive at a level of from about 0.05 to about 2.0 weight percent of the resin component of the layer, and can consist of such materials as crystalline and amorphous silicate. In each of the two working examples of this patent, layer A is an LLDPE film containing a cling additive, namely, polyisobutylene, with synthetic sodium silicate particles being uniformly incorporated throughout layer B of the film of Example 1 and amorphous silica particles being uniformly incorporated throughout layer B of the film of Example 2. Layer B, the layer providing the noncling surface of the films of Examples 1 and 2 is HPLDPE. Improved one-sided cling/one-sided slip stretch wrap films are disclosed in U.S. Pat. No. 4,996,094.

Other multilayer composite films known include those disclosed in U.S. Pat. No. 4,364,981 in which polyethylene films comprising a core or intermediate layer of low pressure low density polyethylene (LPLDPE) and skin layers of high pressure low density polyethylene (HPLDPE) are taught. The LPLDPE described within U.S. Pat. No. 4,364,981 is actually an LLDPE, as may be seen by reference to the process for making LLDPE of U.S. Pat. No. 4,011,382 disclosed at column 1,lines 52–55. The films disclosed are said to be useful in forming bags such as trash bags. No disclosure of possible utility as a stretch wrap may be found within this patent.

U.S. Pat. No. 4,565,720 discloses three layer packaging bags in which an intermediate layer comprising a mixture of LLDPE and high density polyethylene (HDPE) is taught. Outer layers of the bags are made of HPLDPE or a mixture of HPLDPE and an ethylene-vinyl acetate copolymer. The structures disclosed are not cited as being useful in forming stretch wrap films.

A multilayer film in which the intermediate layer comprises LLDPE and HDPE and the outer layers comprise an LLDPE and at least one such outer layer further comprises an HPLDPE is disclosed in U.S. Pat. No. 4,574,104. One film disclosed therein is a three-layer structure in which the intermediate layer comprises LLDPE, HPLDPE and HDPE. Packaging bags are the chief utility cited for these multilayer films. No disclosure of utility as a stretch wrap is made.

U.S. Pat. No. 4,511,609 discloses a multilayer film for use in the manufacture of garbage bags wherein the film comprises a first outer layer of LLDPE, a second outer layer of HPLDPE and a intermediate layer also of HPLDPE or a blend of LLDPE and HPLDPE. No statement as to whether the films disclosed have any possible utility as stretch wraps is made within this patent.

In U.S. Pat. No. 4,657,811, a three-layer plastic film suitable for use in trash bag manufacturing is disclosed wherein an intermediate layer of foamed HPLDPE is disposed between outer layers of LLDPE. Again, the films disclosed are not cited as finding utility as stretch wrap films.

As previously indicated, methods of stretch wrapping articles, containers, etc., are known. U.S. Pat. No. 3,986,611 describes a tension-wrapped palletized load obtained with a stretch wrap film possessing a cling additive.

U.S. Pat. No. 4,079,565 describes a stretch-wrapped package, process and apparatus which employs a stretch wrap polyethylene film.

U.S. Pat. No. 4,409,776 discloses a method and apparatus for packaging articles with a composite stretch wrap film, one surface of which is nonadhesive. The adhesive surface is obtained with an "adhesive film" such as one fabricated from ethylene-vinyl acetate copolymer, 1,2-polybutadiene or styrenebutadiene copolymer and the nonadhesive surface is obtained with a "nonadhesive film" such as one fabricated from a crystalline polyolefin, e.g., polyethylene, polypropylene or ethylene-propylene copolymer.

U.S. Pat. No. 4,409,776 discloses a novel multilayer coextruded thermoplastic stretch wrap film which comprises at least three layers having two outer layers and at least one intermediate layer placed between the outer layers. The intermediate layer is formed from a high pressure low density polyethylene resin and the outer layers are formed from a linear low density polyethylene copolymer such as ethylene copolymerized with a minor amount of at least one $C_4$ to $C_{10}$ alpha-olefin, such as hexene-1, octene-1, decene-1, 4-methyl-pentene-1 and butene-1. The force required to stretch the film can be controlled by the thickness of the intermediate layer relative to overall film thickness, the melt index of the intermediate layer resin, the molecular weight of the intermediate layer resin or a combination such factors.

While it is apparent that a wide variety of stretch wrap films have been disclosed for use in packaging or palletizing operations, virtually all suffer from one or more notable deficiencies. Not all films known in the art possess good on-load stretched cling properties. Other films are deficient in their tensile properties, including the force required in the machine direction (MD) to stretch the film. Still, not all end use applications require the same film characteristics, necessitating the complex production of a broad range of films to suit these applications.

It is therefore an object of the present invention to provide a novel multilayered coextruded film which exhibits good stretched cling and sufficient machine direction force to stretch which is useful in industrial pallet wrapping applications.

It is another object of the present invention to provide multilayered coextruded stretch wrap films in which the amount of force required to stretch the film is controlled by regulating the ratio of polyolefinic resins used to form the intermediate layer of the film.

It is yet another object of the present invention to provide multilayered coextruded stretch wrap films in which the amount of force required to stretch the film is controlled by the melt flow properties of a polyolefinic resin component selected from the group consisting of homopolymers of propylene, copolymers of propylene and ethylene, and mixtures thereof, of the intermediate layer blend.

It is still a further object of the present invention to provide a process for the production of the films of this invention.

It is yet a further object to overcome the aforementioned problems in an effective and economical manner.

Other objects of the invention include the use of a stretch wrap film of the aforementioned characteristics in the overwrapping of a plurality of goods, such as a pallet load, to provide a unitized packaged unit.

Further objects of this invention will become apparent from a reading of the specification and appended claims.

SUMMARY OF THE INVENTION

In accordance with the present invention, a thermoplastic stretch wrap film is provided which comprises at least three layers, the three layers having two outer layers and an intermediate layer positioned between the outer layers. The intermediate layer is produced from a mixture of a first linear low density polyethylene and a polyolefin selected from the group consisting of homopolymers of propylene, copolymers of propylene and ethylene and mixtures thereof. At least one of the two outer layers includes a second linear low density polyethylene.

In one embodiment, the force required to stretch the film is controlled by regulating the melt flow properties of a polyolefinic resin component selected from the group consisting of homopolymers of propylene, copolymers of propylene and ethylene, and mixtures thereof, of the intermediate layer blend.

According to another aspect of the invention, there is provided a method for producing the films of this invention.

DETAILED DESCRIPTION OF THE INVENTION

The present invention is directed to the formation of a laminar stretch wrap thermoplastic film by initially preparing the coextruded stretch wrap product utilizing conventional coextrusion techniques. The material construction of the laminate prepared in accordance with the following examples comprises an intermediate layer produced from a blend of polyethylene and polypropylene resins. The intermediate layer provides the requisite strength and toughness properties necessary for stretch film applications. The polyolefinic resins described below for use in the formation of the outer layers of the stretch wrap films of the present invention also have utility as a blend component for use in the intermediate layer.

The polyolefinic resins employed to make the outer layers of the stretch wrap films of the present invention are those ethylenic copolymers which comprise a major proportion by weight of ethylene copolymerized with a minor proportion by weight of an alpha olefin monomer containing 4 to 10 carbon atoms. Such ethylenic copolymers as mentioned are commonly referred to as linear low density polyethylenes (LLDPE). By the use of the term minor proportion by weight of an alpha olefin monomer is meant a proportion which does not exceed the proportion, by weight, of ethylene present in the copolymer, in other words, a proportion of alpha olefin monomer less than 50 weight percent. Preferably the ethylenic copolymers employed are those having from about 1 to about 20 weight percent of the higher alpha olefin monomer copolymerized therein. In addition, it is also preferred that the alpha olefin monomer employed in the ethylenic copolymer be selected from the group consisting of butene-1, 3-methyl-butene-1, 3-methyl-pentene-1, hexene-1, 4-methyl-pentene-1, 3-methyl-hexene-1, octene-1 and decene-1. Particularly preferred are the hexene-1 alpha olefins. The LLDPE resins are prepared at relatively low pressures employing coordination-type catalysts. Reference may be made to U.S. Pat. Nos. 3,645,992, 4,076,698, 4,011,382, 4,163,831, 4,205,021, 4,302,565, 4,302,566, 4,359,561 and 4,522,987 for more details of the manufacture and properties of LLDPE resins including those which are particularly useful herein.

As discussed above, U.S. Pat. No. 5,273,809 issued on Dec. 28, 1993 from application Ser. No. 07/985,042 which is a divisional continuation application of application Ser. No. 07/903,295, filed on Jun. 24, 1992, which is a continuation-in-part of application Ser. No. 07/296,630, filed on Jan. 12, 1989, which is a continuation of application Ser. No. 07/039,892, filed on Apr. 17,1987, disclosed the discovery that certain LLDPE resins can possess an inherent cling property in the absence of added cling agents. Those resins were found to possess a relatively high weight percentage of n-hexane extractables, as measured by the n-hexane extractables method of 21 C.F.R. 177.1520. Although it has not been confirmed that the n-hexane extractables are, in fact, the cause of the inherent cling property of the stretch wrap film disclosed in U.S. Pat. No. 5,273,809, a correlation between cling and the level of such extractables was disclosed therein, lending support to the view that the extractables are indeed responsible for the cling behavior. Those LLDPE resins possessing a relatively high weight percentage of n-hexane extractables, are particularly preferred for use in forming at least one of the outer layers of the films of the present invention. As may be appreciated by those skilled in the art, depending upon the functionality desired of the particular film to be produced in accordance with the present invention, it will often be particularly preferred that both outer layers be produced from these LLDPE resins. Preferably, these LLDPE resins for use in the outer film layers will contain from about 3.5 to about 15 and, still more preferably, from about 4 to about 8, weight percent of n-hexane extractables. It should be noted that it has been discovered that a level of less than 3 wt. % n-hexane extractables will not provide an acceptable level of cling for commercial purposes. The n-hexane extractables method of 21 C.F.R. 177.1520 is presented in U.S. Pat. No. 5,273,809, the contents of which are hereby incorporated by reference for those details.

The level of n-hexane extractibles in the preferred films of this invention can also be expressed in terms of a specific cling force. A test procedure for use in measuring cling force is presented in U.S. Pat. No. 5,273,809, the contents of which are hereby incorporated by reference for those details. Employing the test procedure hereinafter described, the n-hexane extractible component of the LLDPE film should be such as to provide a cling force of at least about 140 grams, preferably at least about 200 grams. Cling forces exceeding 200 grams, e.g., 300–400 grams, are also within the scope of this invention.

The LLDPE resins for use in the practice of this invention have a density ranging from about 0.905 to about 0,940 gm/c.c. and a melt index of from about 1 to about 10. Particularly preferred are those LLDPE resins possessing densities within the range from about 0.917 to 0.920 gm/c.c. and melt indices within the range from about 2.0 to 5.0.

The LLDPE resin can be blended or alloyed with minor amounts, e.g., up to about 20 weight percent total, of one or more other suitable resins to achieve a desired range of physical/mechanical properties in the film product. Thus, for example, such resins as EVA copolymer, HPLDPE and other LLDPE resins may be used for blending to obtain useful mixtures for forming the outer layers of the films of this invention.

When used to form the outer layers of the multilayer films of he present invention, the LLDPE resins can also contain known and conventional cling additives to augment the cling property which, at least in the case of the particularly preferred resins, is inherently exhibited. Examples of useful cling additives include polyisobutylenes having a number average molecular weight in the range of from about 1,000–3,000 grams per mole as measured by vapor phase osmometry, amorphous atactic polypropylenes, e.g., those having an average molecular weight of about 2000, polyterpenes and ethylene-vinyl acetate copolymers containing from about 5–15 weight percent copolymerized vinyl acetate. As disclosed in U.S. Pat. No. 4,996,094, hereby incorporated by reference in its entirety, polyisobutylene having a number average molecular weight exceeding 2500 has been found to exhibit the unusual benefits of reduced additive migration and reduced surface transfer (pickoff). As such, these are the more preferred agents for use in this invention. The optional cling additive can be present in the outer layers in a concentration of from about 0.5 to about 10 pounds per 100 pounds of resin. Of course, other conventional film additives such as antioxidants, UV stabilizers, pigments, dyes, etc., can be present in the usual amounts.

The intermediate layer of the films produced in accordance with the present invention is made from a blend of polyethylene and polypropylene resins. Such an intermediate layer provides the requisite strength and toughness properties necessary for stretch film applications. The films of the present invention provide the additional advantage that the blend ratio of polyethylene to polypropylene employed to form the intermediate layer can be adjusted to increase or decrease the amount of force required to stretch the film in pallet wrapping operations. As may be appreciated by those skilled in the art, this feature allows the manufacturing process to be easily adjusted to produce a film which is customized for a particular pallet wrapping application.

Any polypropylene resin capable of being formed into a film is envisioned as useful in the practice of the present invention. Preferred resins include homopolymers of propylene and copolymers of propylene wherein the major comonomer constituent is propylene. Particularly preferred copolymers are the random copolymers of propylene and ethylene wherein the ethylene comonomer content comprises less that 20 weight percent of the overall copolymer. Still more preferred are the random copolymers of propylene wherein the ethylene comonomer comprises 1.0 to 7.0 weight percent of the copolymer.

Propylene homopolymer is a well-known, commercially available polymer obtained by the stereoregular polymerization of propylene based on the use of Ziegler-Natta catalysts. Such catalysts generally are the reaction product of an organometallic compound belonging to Groups IA to IIIA with a compound of a transition metal of Groups IVB to VIII. Propylene homopolymer and the preparation thereof are described in greater detail by G. Crespi and L. Luciani in "Olefin Polymers (Polypropylene)," *Kirk-Othmer Encyclopedia of Chemical Technology*, Third Edition, John Wiley & Sons, New York (1981), Volume 16, pages 453–469, the entire contents of which are incorporated by reference.

Random copolymers of propylene and ethylene are also well-known and commercially available. Random copolymers are generally made by adding a minor percentage of ethylene, usually about 1 to 7 weight percent, into the polypropylene polymerization reactor. The effect of random copolymerization on polymer properties is exhibited by differences in polymer crystallinity, melting point (Tm), glass transition temperature (Tg), and the solubility between a copolymer and the corresponding homopolymers. In addition to the above cited Kirk-Othmer reference, additional details concerning random copolymers and their preparation may be found in D. N. Schulz and D. P. Tate, "Copolymers," *Kirk-Othmer Encyclopedia of Chemical Technology*, Third Edition, John Wiley & Sons, New York (1979), Volume 6, pages 798–818, the entire contents of which are hereby incorporated by reference.

The polyethylene resins described above for use in the formation of the outer layers of the stretch wrap films of the present invention also have utility as a blend component for use in the intermediate layer. LLDPE resins having from about 1 to about 20 weight percent of a higher alpha olefin monomer copolymerized therewith are preferred. Particularly preferred are those LLDPE's wherein the alpha olefin monomer employed in the ethylenic copolymer is a hexene-1 alpha olefin. In addition, the resins particularly preferred for use in the extrusion of the outer layers of the present invention and described in U.S. Pat. No. 5,273,809 issued on Dec. 28, 1993 from application Ser. No. 07/985,042 which is a divisional continuation application of application Ser. No. 07/903,295 filed on Jun. 24, 1992, which is a continuation-in-part of application Ser. No. 07/296,630, filed on Jan. 12, 1989, which is a continuation of application Ser. No. 07/039,892, filed on Apr. 17, 1987, namely those resins having a relatively high weight percentage of n-hexane extractables, as measured by the n-hexane extractables method of 21 C.F.R. 177.1520, may also be used in forming the blends for use in the intermediate layer.

The multilayer film compositions of this invention have been found to provide good stretched cling and high machine direction force to stretch which are desirable features in industrial pallet wrapping applications. In one embodiment, the amount of force required to stretch the film can also be controlled by the thickness of the intermediate layer. In the processing of the films of this invention, the thickness of the intermediate may be adjusted by increasing or decreasing the speed of the intermediate layer extruder. This feature allows another feature of the manufacturing process to be easily manipulated to produce a customized film.

As disclosed above, it has been found that tensile properties of the multilayer films of this invention can be controlled or varied by controlling the melt flow properties of the resins used to form the intermediate layer blend. The amount of force required to stretch the finished, coextruded multilayer films of this invention has been found to vary inversely with an increase in the melt flow rate (melt index for the polyethylene component) of the intermediate layer; that is an increase in the melt flow rate of any resin used in that blend will result in a multilayer film requiring less force to stretch the film to the same extent, all other relevant parameters held constant. It is within the scope of this invention to vary the melt flow properties of either the polyethylene resin or the polypropylene resin either independently or in combination with a variation in the relative blend ratios to achieve the desired end result. Likewise, the thickness of the intermediate layer in relation to the overall film thickness may be varied independently of melt flow properties and/or blend ratio or in combination therewith to achieve the desired stretch characteristics. As is well known by those skilled in the art, when reference is made herein to melt flow rate, it is understood that that property is determined in accordance with ASTM Standard Test Method D-1238 and when reference is made herein to melt index, it is understood that that property is determined in accordance with ASTM Standard Test Method D-2839. These methods are hereby incorporated by reference herein in their entirety.

The film thickness, of these multilayer films can vary widely and in general, can be a thickness which is typical for stretch wrap films. A total film thickness of from about 0.5 to about 2.5 mils, preferably from about 0.7 to about 1.5 mils, is suitable for most applications. In the case of multilayer films constructed in accordance with this invention, the outer layers together can represent from about 10 to about 95, and preferably from 20 to about 90, percent of the total gauge thickness with the intermediate layers representing the balance of the thickness.

In the multilayer films of this invention possessing a non-cling surface layer, the layer can contain an anticling additive and/or any other component which imparts a capability for relative movement between this layer and an adjacent layer of itself. This embodiment overcomes the problem, noted in U.S. Pat. No. 4,518,654, supra, of the tendency of a pallet load overwrapped with a stretch wrap film possessing cling on both of its major surfaces from destructively pulling away from a similarly overwrapped pallet load with which it is in contact when one of the pallet loads is moved relative to the other (as would be the case in the fork lift truck-handling of such overwrapped pallet loads stored in a warehouse). The anti-cling additive present in the non-cling exterior layer can be any of those previously known to be useful for this purpose, e.g., crystalline and amorphous silicas, a synthetic sodium aluminum silicate such as $Na_2O.Al_2O_3.S_iO_2.4H_2O$, diatomaceous earth, talc, etc., having a particle size range of from about 0.5 to about 20 microns. The anti-cling agent can be present in a widely ranging amount, e.g., from about 500 to about 20,000 ppm. Other additives, e.g., any of those previously mentioned, as well as anti-blocking agents, coefficient of friction (COF) reducing agents, etc., can be present in the non-cling layer(s) of the multilayer film embodiment of this invention.

Either or both major surfaces of the film can be treated by such known and conventional post-forming operations as corona discharge, chemical treatment, flame treatment, etc., to modify the printability or ink receptivity of the surface(s) or to impart other desirable characteristics thereto.

The stretch wrap film of this invention can, if desired, be provided in the non-stretched, i.e., unoriented, or at most only modestly stretched, state prior to use. Thus, the film herein can be capable of undergoing stretch from less than about 50 to about 500, and preferably from about 75 to about 400, linear percent during the overwrapping operation.

It is preferred to employ known and conventional techniques of coextrusion to assemble the composite structures of the films of this invention. Reference may be made to U.S. Pat. No. 3,748,962, the contents of which are incorporated by reference herein, for details of a coextrusion procedure which can be employed in the fabrication of a multilayer film in accordance with this invention.

The pallet unitizing techniques described in U.S. Pat. Nos. 3,986,611 and 4,050,221 are contemplated herein. The disclosures of these patents are incorporated herein in their entirety by reference.

The following demonstrate the extent of the unexpected results obtained with the multilayer stretch wrap films of the present invention. The invention is illustrated by the following non-limiting examples:

EXAMPLES 1-4

Utilizing the aforementioned method of extrusion, four three-layer (A/B/A) coextrusions were produced, as shown below, to compare film properties resulting from varying the intermediate, B-layer, blend ratio of propylene homopolymer to linear low density polyethylene. In examples 1-4 that follow, the blend ratio of the mixture in the B layer was varied from 95% propylene homopolymer/5% LLDPE to 85% propylene homopolymer/15% LLDPE. All examples were produced on a production cast line using a die block arrangement that provided a tapered core profile. These films were produced at 0.80 mil gauge, with melt temperatures of approximately 530°-540° F. for the outer, A, layers of LLDPE and 435°-445° F. for the LLDPE/polypropylene blend intermediate, B layer.

| Ex. | Layer | Percent of Total Film Thickness | Polyolefin Component | Force Required To Stretch Film To 200% Elongation |
|---|---|---|---|---|
| 1 | A | 40% | [1]Exxon LPY-54 LLDPE, 0.918 gm/cc, MI = 3.3 | 3500 psi |
|  | B | 20% | Blend of 95% [2]Fina W472 Homopolymer of propylene 0.92 gm/cc, MFR = 4.0, and 5% Exxon LPY-54 LLDPE 0.918 gm/cc, MI = 3.3 |  |
|  | A | 40% | Exxon LPY-54 LLDPE, 0.918 gm/cc, MI = 3.3 |  |
| 2 | A | 40% | Exxon LPY-54 LLDPE, 0.918 gm/cc, MI = 3.3 | 3000 psi |
|  | B | 20% | Blend of 85% Fina W472 Homopolymer of propylene 0.92 gm/cc, MFR = 4.0, and 15% Exxon LPY-54 LLDPE 0.918 gm/cc, MI = 3.3 |  |
|  | A | 40% | Exxon LPY-54 LLDPE, 0.918 gm/cc, MI = 3.3 |  |
| 3 | A | 40% | Exxon LPY-54 LLDPE, 0.918 gm/cc, MI = 3.3 | 2500 psi |

-continued

| Ex. | Layer | Percent of Total Film Thickness | Polyolefin Component | Force Required To Stretch Film To 200% Elongation |
|---|---|---|---|---|
| | B | 20% | Blend of 95% ³Fina W8573A Homopolymer of propylene 0.92 gm/cc, MFR = 6.0, and 5% Exxon LPY-54 LLDPE 0.918 gm/cc, MI = 3.3 | |
| | A | 40% | Exxon LPY-54 LLDPE, 0.918 gm/cc, MI = 3.3 | |
| 4 | A | 40% | Exxon LPY-54 LLDPE, 0.918 gm/cc, MI = 3.3 | 1950 psi |
| | B | 20% | Blend of 85% Fina W8573A Homopolymer of propylene 0.92 gm/cc, MFR = 6.0, and 15% Exxon LPY-54 LLDPE 0.918 gm/cc, MI = 3.3 | |
| | A | 40% | Exxon LPY-54 LLDPE, 0.918 gm/cc, MI = 3.3 | |

[1] Exxon LPY-54 LLDPE is a hexene-1-based ethylene copolymer.
[2] Fina W472 is a homopolymer of propylene; melt flow rate = 4.
[3] Fina W8573A is homopolymer of propylene; melt flow rate = 6.

While no cling agent was employed in the manufacture of these films, the films of Examples 1–4 were found to exhibit good, on-load stretched cling due to the use of the hexene-based LLDPE to form the outer skin layers of the films. The LLDPE used is known to possess a relatively high level of n-hexane extractables which is believed to result in good inherent cling. As shown, the force required to stretch the film to 200% elongation was measured to be within the range of 1950 to 3500 psi for the films of Examples 1–4. Additionally, the films were found to exhibit good load retention characteristics and excellent optics due to the lack of transverse direction (TD) banding, as well as good resistance to puncture and tear.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims.

What is claimed is:

1. A thermoplastic stretch wrap film for the overwrapping of palletized loads comprising at least three layers,
   said three layers having two outer layers and an intermediate layer positioned between said outer layers,
   said intermediate layer comprising a mixture having a blend ratio of from 95% propylene homopolymer/5% linear low density polyethylene to 85% propylene homopolymer/15% linear low density polyethylene, and at least one of said two outer layers comprising a second linear low density polyethylene,
   said second linear low density polyethylene consisting essentially of ethylene copolymerized with about 1 to 20 weight percent total of at least one alpha olefin having from 4 to 10 carbon atoms and containing from 3.5 to 15 weight percent n-hexane extractibles,
   said n-hexane extractibles being present in an amount sufficient to cause the stretch wrap film to exert a cling force when in surface-to-surface contact with itself or another surface when used in the stretch overwrap packaging of articles,
   wherein the amount of force required to stretch the stretch wrap film can be controlled by adjusting the blend ratio of said mixture.

2. A film according to claim 1, wherein each of said two outer layers comprises said second linear low density polyethylene.

3. A film according to claim 1 wherein said first linear low density polyethylene and said second linear low density polyethylene are equivalent materials.

4. A film according to claim 1, wherein said alpha olefin is present in said second linear low density polyethylene and is a member selected from the group consisting of butene-1; 3-methyl- butene-1; 3-methyl -pentene- 1; 4-methyl -pentene- 1; hexene- 1; 3-methyl-hexene-1; octene-1; decene-1 and mixtures thereof.

5. A film according to claim 4, wherein said second linear low density polyethylene has a density of about 0.905 to 0.940 grams/c.c. and a melt index of about 1.0 to 10.0.

6. A film according to claim 5, wherein said second linear low density polyethylene has a melt index from about 2.0 to 5.0 and a density from about 0,917 to 0.920 grams/c.c. and said alpha olefin is hexene-1.

7. A film according to claim 6, wherein said intermediate layer thickness is between about 5 and 90 percent of overall film thickness.

8. A film according to claim 7, wherein said second linear low density polyethylene contains from 4 to 8 weight percent n-hexane extractibles.

* * * * *